Dec. 8, 1959 N. PUNT 2,916,341

STORAGE UNIT FOR PHONOGRAPH RECORDS

Filed May 16, 1957 4 Sheets-Sheet 1

NEAL PUNT

INVENTOR

BY Glenn B. Morse

ATTORNEY

Dec. 8, 1959 N. PUNT 2,916,341

STORAGE UNIT FOR PHONOGRAPH RECORDS

Filed May 16, 1957 4 Sheets-Sheet 2

NEAL PUNT
INVENTOR

BY Glenn B. Evans
ATTORNEY

Dec. 8, 1959 N. PUNT 2,916,341

STORAGE UNIT FOR PHONOGRAPH RECORDS

Filed May 16, 1957 4 Sheets-Sheet 3

NEAL PUNT
INVENTOR

BY Glenn B. Morse
ATTORNEY

STORAGE UNIT FOR PHONOGRAPH RECORDS

Filed May 16, 1957

NEAL PUNT
INVENTOR

BY

ATTORNEY

United States Patent Office 2,916,341

Patented Dec. 8, 1959

2,916,341

STORAGE UNIT FOR PHONOGRAPH RECORDS

Neal Punt, Ellsworth, Mich.

Application May 16, 1957, Serial No. 659,512

10 Claims. (Cl. 312—11)

This invention relates to the storage of phonograph records in a device which can be incorporated conveniently into an article of furniture. The two basic considerations affecting the manner of storage of records are the physical protection of the records and the preservation of an arrangement which groups them according to diameter or some other convenient characteristic. Simplicity of design of the unit is of great importance, as its use in connection with ordinary household furniture necessarily involves a rather wide accumulation of manufacturing tolerances.

The present invention utilizes a series of envelope-like pockets for receiving the records in side-by-side relationship with the preferred form of the invention involving a unit having openings on each of four sides which lead into separate storage sections. Records of a given diameter may be inserted along the group of openings constituting one side of the expandable storage unit, with the possibility being present of accommodating four different diameters. In the event that the records were not sorted according to diameter, any other basis could be used for distinguishing between groups associated with each series of openings.

In addition to the envelope unit, the invention provides a structure which selectively presents one side of the unit (corresponding to one group of openings) in a desired position for providing access. A system of movable beams is also provided which constitute barriers across each group of openings. Normally egress from the openings is barred by the presence of the beams, but the particular group which is disposed in access position may be uncovered by movement of the beam unit associated with that group of openings. In effect, the beams constitute a basket-like retention system for the storage unit which is mounted for rotation on a preferably horizontal axis. In one form of the invention, the rotatable mounting of the beam systems and its enclosed storage unit is provided through receiving the opposite ends of the beam units in a track associated with the frame or cabinet, with an exit pathway being provided for the withdrawal or partial removal of the beam unit when access to the openings is required.

In a modified form of the invention, the beams are retained in rotatable brackets which are supported in suitable coaxial bearings at the opposite sides of the cabinet, with the beams being removable at the access position. Either of these systems of rotatable mounting can be incorporated in an article of furniture without serious limitation on the exterior design of the cabinet.

The several features of the invention will be analyzed in detail through a discussion of the particular embodiments illustrated in the accompanying drawings. In the drawings:

Figure 1 presents a perspective view of a record cabinet embodying one form of the invention, and showing one of the beam units swung outwardly to provide access to the storage unit.

Figure 2 is a transverse section of the device shown in Figure 1, with various possible positions of the beam unit being indicated in dotted lines.

Figure 3 presents a front elevation of the unit shown in Figure 1, partially in section, and indicating the closed position of the cabinet.

Figure 8:
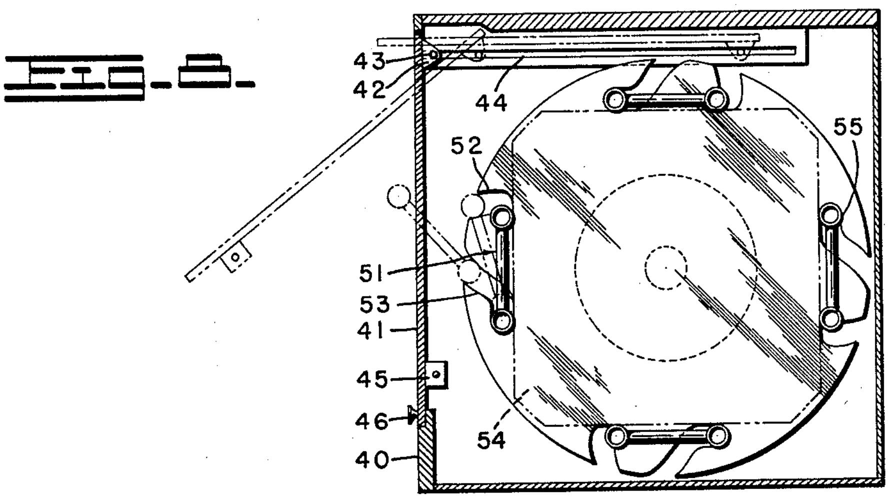

Figure 8 presents a transverse section of a modified form of the invention.

Figure 9:
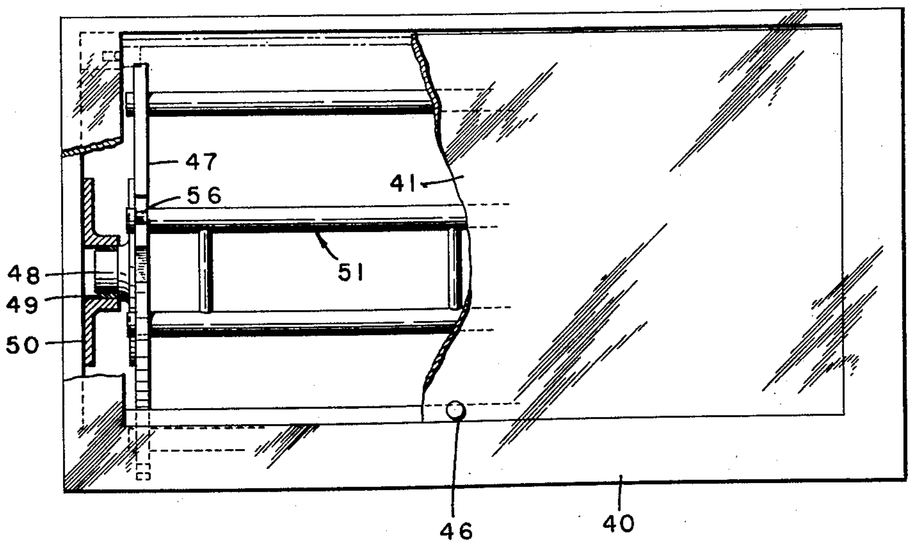

Figure 9 presents a front elevation, partially in section, of the modification illustrated in Figure 8.

Figure 1:
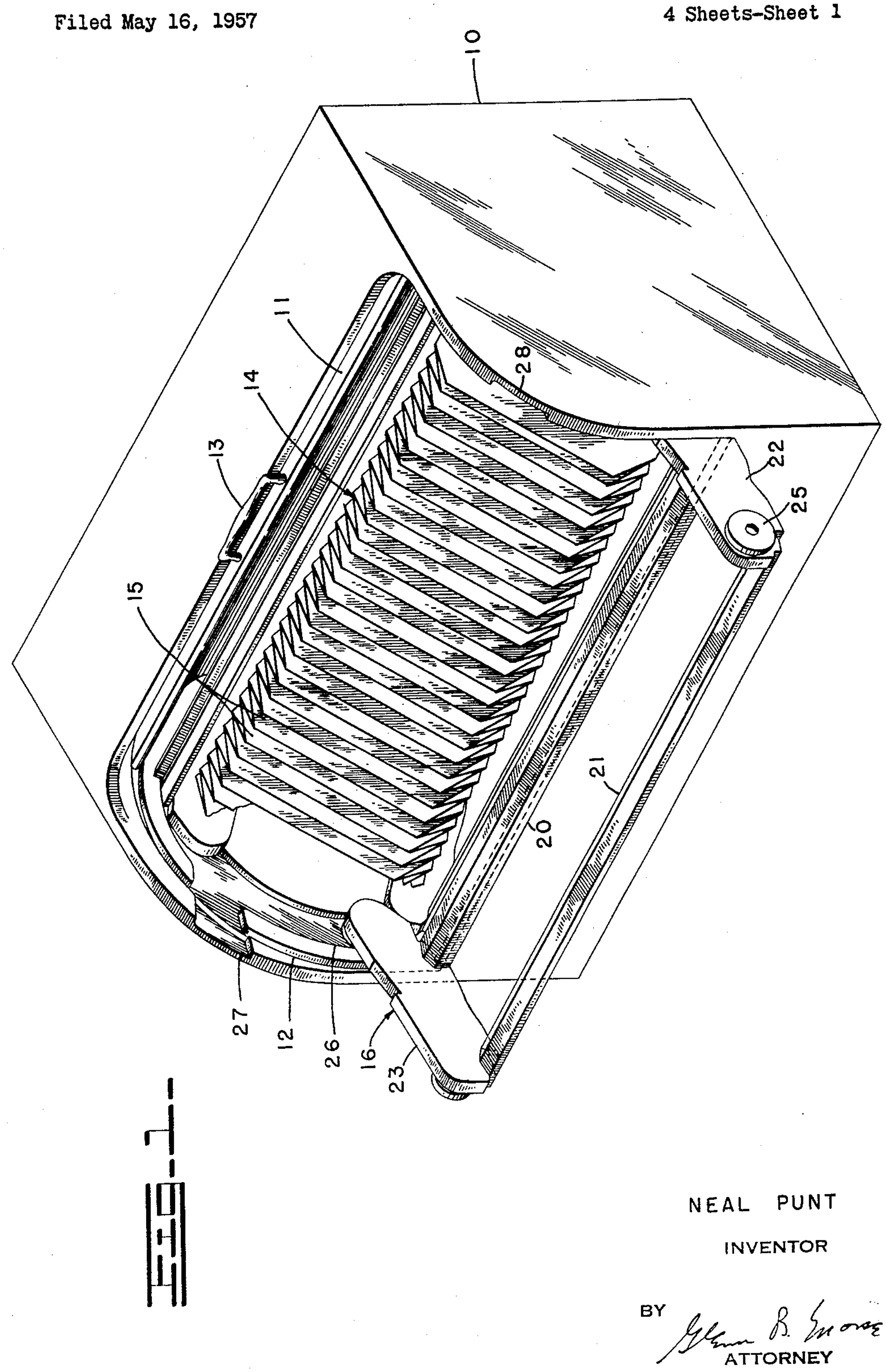

Referring to the drawings, the record cabinet 10 is provided with a roll-top door 11 which moves within the channel 12 under the urging of forces applied to the handle 13. Figure 1 illustrates the cabinet with the door 11 rolled back to expose the contents. The storage unit generally indicated at 14 is an expandable series of envelopes formed according to a procedure described hereinafter, and provides a series of openings at each of four sides for receiving records. Two openings of the series are shown in side-by-side relationship as indicated at 15.

Figure 3:
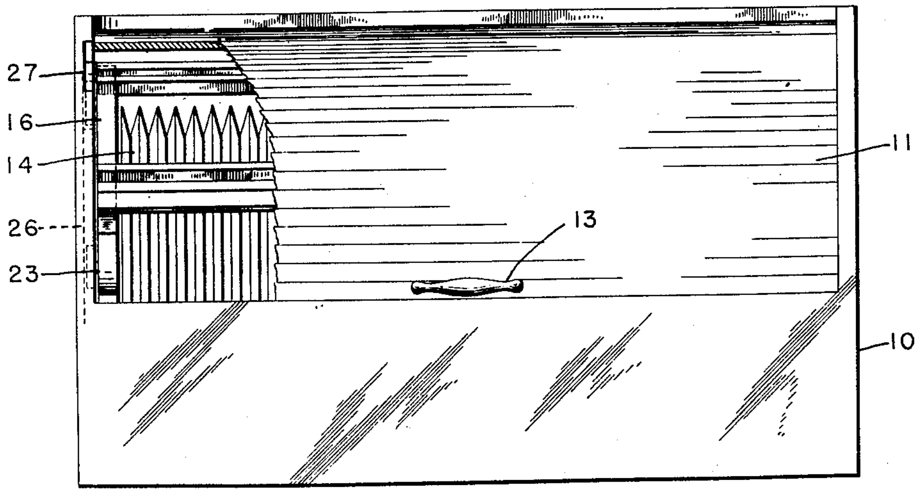
Figures 4, 5, 7:
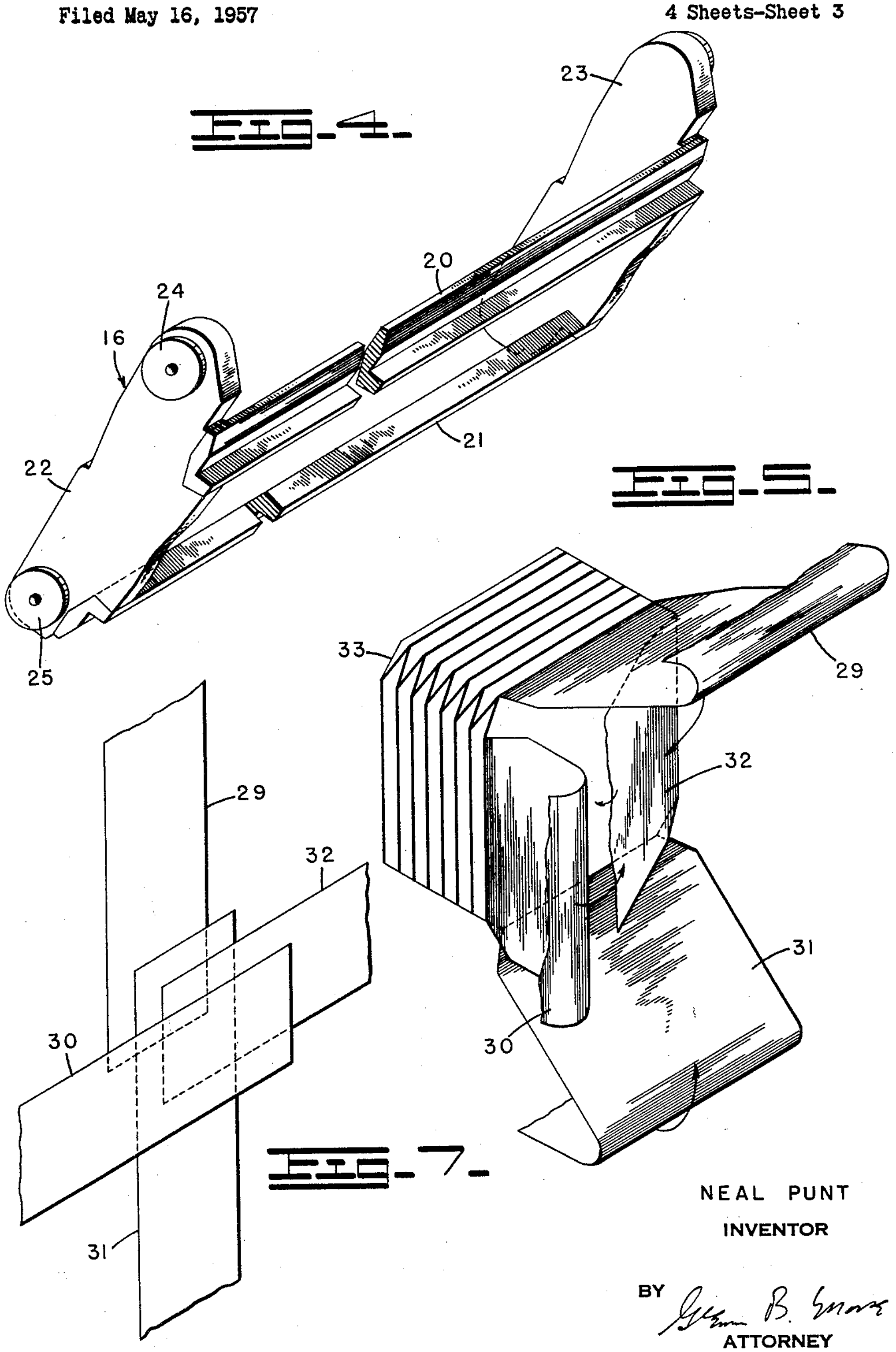
Figure 4 is a perspective view showing one of the beam units, on an enlarged scale.
Figure 5 is a perspective view showing the type of folding operations involved in the development of the storage unit.
Figure 7 illustrates with a schematic diagram the initial position of the strips of paper prior to beginning the folding operations illustrated in Figure 5.

A mechanism within the cabinet 10 is responsible for the support of the storage unit 14, and for selectively presenting one of the four different sides corresponding to a particular group of openings. In the modification shown in Figures 1, 2, and 3, the support of the record unit is provided by a set of four retaining beam units identified at 16, 17, 18, and 19. Each of these units is similar in its construction, and is best illustrated in Figure 4. Each of the beam units includes a pair of beams 20 and 21 extending between the end members 22 and 23. A set of wheels as indicated at 24 and 25 is provided on each of the end members for engaging the tracks 26 in the opposite ends of the cabinet 10, and an escape channel is shown at 27 and 28 through which one of the wheels at a time at each end may be removed from its respective track. Removal of one wheel at each end permits the beam unit to be swung out into the position shown in Figure 1 which results in exposing the group of openings in the storage unit which have been previously covered by that beam unit. When all of the beam units are in the fully closed position as shown in full lines in Figure 2, the record storage unit 14 is confined as if it were in a basket.

Figure 2:
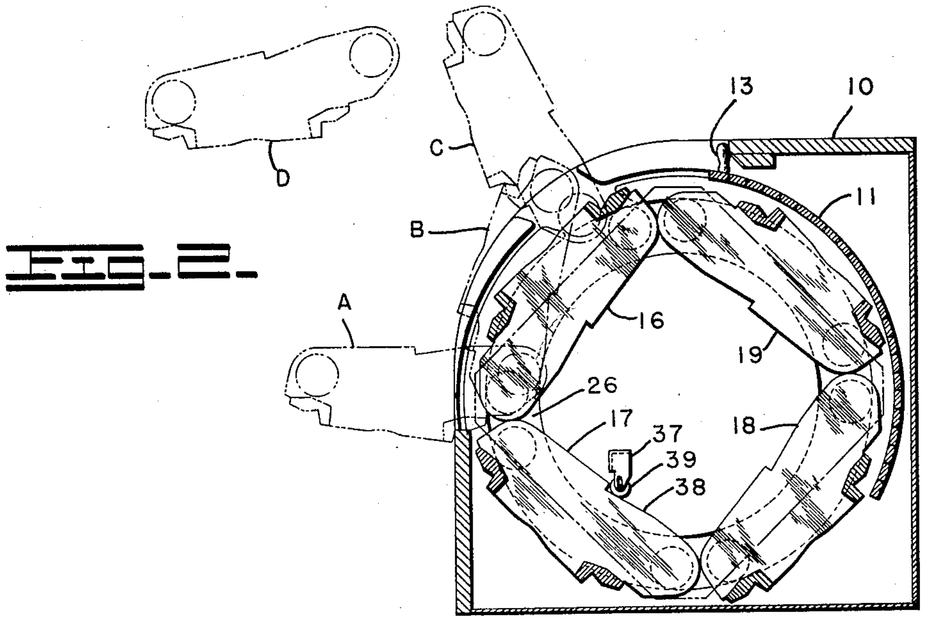

The sequence of steps in moving the beam units into open position corresponding to a position opposite the opening of the cabinet is illustrated in dotted lines in Figure 2. The normal access position is indicated at "A," with an intermediate position being shown at "B" in which the upper wheel at each side of the beam unit is emerging through the channels 27 and 28. Withdrawal of the beams from the device may be accomplished following the swing-out position by rotating the entire assembly until the remaining wheels in engagement with the tracks 26 come into position opposite the escape channels, and thereby permit the removal of the beam units through the successive positions "C" and "D." Installation of the beam units follows the reverse of this procedure. Movement of the beams around the channel corresponds to a rotation of the entire record unit upon a horizontal axis.

Figure 6:
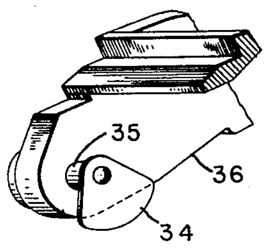
Figure 6 is a fragmentary perspective view showing a modified form of the end of one of the retention beams.

The preferred form of the storage unit is constructed as indicated in Figures 5 and 7. Initially, a set of four strips of paper 29—30—31—32 are laid with their ends in overlapping relationship as shown in Figure 7, and then secured together. A sequence of folding operations is then performed in which each of the strips in sequence is looped over the area of intersection of the strips, with the remaining portion of the strip still retaining its original direction. Each of these loops establishes a pocket, and the sequence of the folding operations will proceed to create a group of openings on each of the four sides of the resulting storage unit which assumes a square shape in cross section. After the folding operation has been performed and the end elements secured, the corners may be sheared off as indicated at 33 in Figure 5 to increase the accessibility to the pockets and establish a greater clearance within the cabinet. The cross section of the storage unit is indicated in dotted lines in Figure 2, and the removal of the corners considerably decreases the space required without sacrificing any of the storage capacity. This construction results in an accordion-like expansibility, and it is often desirable to incorporate at each end of the beam units a tab 34 mounted on a boss 35 so that the tab may be inserted in the end envelope at both ends of the unit to retain the expanded condition. This construction is shown in Figure 6, and may be considered as a preferable but not vital arrangement. The retention tabs may be added to a beam unit 36 which is otherwise similar in construction to those previously described.

It is also desirable to clearly establish the access position of the assemblies of beam units around the track which corresponds to the point at which one of the beam units may be swung out to expose the contents of the storage unit. As the entire assembly is rotated by pulling successively on one beam and then another, a spring-loaded detent 37 will progressively engage the notches 38 in each of the end members of the beam units, and the abutment of the wheels 39 with the ends of the notches will give a clear indication that the position has been reached where one of the beam units can be swung out. The details of the detent units 37 are conventional, and form no part of this invention. It is merely necessary that the wheels 39 be mounted in such a manner as to have a freedom of movement in a substantially radial direction to accommodate the varying distances between the inside of the end members of the beam units and the axis of rotation. A device similar to an ordinary roller cabinet latch will serve this purpose.

Referring to Figures 8 and 9, a modified form of the invention is illustrated in which the cabinet 40 has a door 41 mounted so that it can be swung outwardly from its bottom and then shoved inward in a position parallel to the top of the cabinet. The bracket 42 is provided with a stud 43 which engages a guideway 44 for establishing the path of movement of the door, and this construction is duplicated at the opposite end of the cabinet. Another bracket 45 is preferably associated with the bottom of the door, and which cooperates with a spring-loaded detent for maintaining the door in the closed position until forces are applied to the handle 46.

The principal point of differentiation of the modification shown in Figures 8 and 9 from that previously described centers in the use of the end plates 47 which are each provided with a stub shaft 48 journaled in the bearings 49 supported on the base 50 at the opposite ends of the cabinet. A set of beam units similar to the unit 51 is supported by the plates 47 in a series of slots as best shown in Figure 8. At each end of the beam units, a pair of slots of the configuration shown at 52 and 53 is provided, the shape resulting in the necessity of applying a slight lifting action to the beam unit to place it in condition for the withdrawal of the upper portion to expose one series of openings in the record storage unit generally indicated at 54. The storage unit should be subject to a slight degree of compression in order to utilize the particular form of the slots illustrated in Figure 8, which utilizes a slight recurvature of the slots 53 at the position indicated at 55. This arrangement prevents the beam untis from dropping downwardly on the rear side of the assembly. The use of slots of this particular configuration is largely a matter of choice, and other arrangements for maintaining the position of the beam units until access is required may be utilized. A torsional spring arrangement which permits the beam units to swing outwardly like a gate is entirely practical, as well as the use of positive latches. In the modifications shown in Figures 8 and 9, it is also preferable that at least one of the beam sections engage one of its respective slots at a shoulder which establishes the spaced relationship between the opposite plates 47. This arrangement also prevents the opposite ends of the beam from bearing on the end portions of the cabinet in order to maintain the engagement with the respective end plates. The provision of the annular grooves at both points of engagement of the beam units with the end plates will have the advantage of creating a degree of torsional stability which limits the rotation of one end plate with respect to the other. One of such grooves is indicated at 56 in Figure 9.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A storage device, comprising: a polygonal pocket unit having a group of side-by-side openings at a plurality of the edges thereof; a group of beam units normally confining and supporting said pocket unit, at least one of said beam units extending along said pocket unit opposite each group of said openings normally barring egress therefrom of the contents thereof; frame means for supporting said beam units; and means forming a common rotatable mounting for said beam units including coaxial bearing means mounted on said frame means adjacent the opposite ends of said beam units, and bracket means rotatably mounted in said bearing means and having portions for removably receiving the ends of said beam units; and cabinet means enclosing said device and having an access opening opposite the position of disengagement of said beam units.

2. A storage device, comprising: an expansible pocket unit having a group of side-by-side openings at a plurality of positions around the edges thereof; a group of disengageable beam units normally confining and supporting said pocket unit, at least one of said beam units extending along said pocket unit opposite each group of said openings normally barring egress therefrom of the contents thereof, said beam units providing a tab at the opposite ends of said pocket units for engaging certain of said openings; frame means for supporting said beam units; and means forming a common rotatable mounting for said beam units in said frame means on a horizontal axis.

3. A storage device, comprising: a polygonal pocket unit having a group of side-by-side openings at a plurality of the edges thereof, said pocket unit including a group of folded strips interengaged to form a series of pockets, said polygonal pocket unit having the corners thereof trimmed off at the opposite ends of said openings on a diagonal with respect to said edges; a group of disengageable beam units normally confining and supporting said pocket unit, at least one of said beam units extending along said pocket unit opposite each group of said openings normally barring egress therefrom of the contents thereof; frame means for supporting said beam units; and means forming a common rotatable mounting for said beam units in said frame means on a horizontal axis.

4. A storage device, comprising: a polygonal pocket unit having a group of side-by-side openings at a plurality of the edges thereof, said pocket unit including a group of four strips initially disposed in overlapping relationship forming a cross, each strip forming a leg of said cross being doubled back in sequence over the intersection of said strips, certain of the end laminae formed by said strips being secured together; a group of disengageable beam units normally confining and supporting said pocket unit, at least one of said beam units extending along said pocket unit opposite each group of said openings normally barring egress therefrom of the contents thereof; frame means for supporting said beam units; and means forming a common rotatable mounting for said beam units in said frame means on a horizontal axis.

5. A storage device, comprising: a polygonal pocket unit having a group of side-by-side openings at a plurality of the edges thereof, said pocket unit including a group of strips interengaged to form a series of pockets, said strips being initially disposed in overlapping relationship, each strip being doubled back in sequence over the intersection of said strips; a group of disengageable beam units normally confining and supporting said pocket unit, at least one of said beam units extending along said pocket unit opposite each group of said openings normally barring egress therefrom of the contents thereof; frame means for supporting said beam units; and means forming a common rotatable mounting for said beam units in said frame means on a horizontal axis.

6. A storage device, comprising: a polygonal pocket unit having a group of side-by-side openings at a plurality of the edges thereof, said pocket unit including a group of folded strips interengaged to form a series of pockets; a group of disengageable beam units normally confining and supporting said pocket unit, at least one of said beam units extending along said pocket unit opposite each group of said openings normally barring egress therefrom of the contents thereof; frame means for supporting said beam units; and means forming a common rotatable mounting for said beam units in said frame means on a horizontal axis.

7. A storage device, comprising: an integral expandable pocket unit having a group of side-by-side openings at positions around the edges thereof; a group of disengageable beam units normally confining and supporting said pocket unit, at least one of said beam units extending along said pocket unit opposite each group of said openings normally barring egress therefrom of the contents thereof; frame means for supporting said beam units; and means forming a common rotatable mounting for said beam units in said frame means on a horizontal axis, said beam units, at each end thereof, engaging said mounting at spaced points.

8. A storage device, comprising: a pocket unit having a group of side-by-side openings at positions around the edges thereof; a group of beam units normally confining and supporting said pocket unit, at least one of said beam units extending along said pocket unit opposite each group of said openings normally barring egress therefrom of the contents thereof; frame means for supporting said beam units; and means forming a common rotatable mounting for said beam units including parallel endless track means fixed with respect to said frame means and engaging the opposite ends of said beam units at spaced points along said track means, said track means having an exit path providing for the escape of one portion of said beam units at a selected position for providing access to said openings.

9. A storage device, comprising: a pocket unit having a group of side-by-side openings at positions around the edges thereof; a group of beam units normally confining and supporting said pocket unit, at least one of said beam units extending along said pocket unit opposite each group of sadi openings normally barring egress therefrom of the contents thereof; frame means for supporting said beam units; and means forming a common rotatable mounting for said beam units including parallel endless track means fixed with respect to said frame means and engaging the opposite ends of said beam units, said track means having an exit path providing for the escape of said beam units at a selected position for providing access to said openings.

10. A storage device, comprising: a pocket unit having a group of side-by-side openings at positions around the edges thereof; a group of disengageable beam units normally confining and supporting said pocket unit, at least one of said beam units extending along said pocket unit opposite each group of said openings normally barring egress therefrom of the contents thereof; frame means for supporting said beam units; and means forming a common rotatable mounting for said beam units in said frame means, said beam units, at each end thereof, engaging said mounting at spaced points.

References Cited in the file of this patent

UNITED STATES PATENTS

| | | |
|---|---|---|
| 1,337,922 | Langley | Apr. 20, 1920 |
| 1,419,487 | Blocker | June 13, 1922 |
| 2,581,547 | Martini | Jan. 8, 1952 |

FOREIGN PATENTS

| | | |
|---|---|---|
| 660,916 | Great Britain | Nov. 14, 1951 |